United States Patent
Chiolerio et al.

(10) Patent No.: US 12,218,611 B2
(45) Date of Patent: Feb. 4, 2025

(54) DEVICE FOR CONVERTING THERMAL ENERGY INTO ELECTRICAL ENERGY

(71) Applicants: FONDAZIONE ISTITUTO ITALIANO DI TECNOLOGIA, Genoa (IT); POLITECNICO DI TORINO, Turin (IT)

(72) Inventors: Alessandro Chiolerio, Turin (IT); Erik Garofalo, Nole (IT); Luca Cecchini, Ariccia (IT); Matteo Bevione, Bra (IT)

(73) Assignees: FONDAZIONE ISTITUTO ITALIANO DI TECNOLOGIA, Genoa (IT); POLITECNICO DI TORINO, Turin (IT)

( * ) Notice: Subject to any disclaimer, the term of this patent is extended or adjusted under 35 U.S.C. 154(b) by 224 days.

(21) Appl. No.: 18/006,033

(22) PCT Filed: Jul. 22, 2021

(86) PCT No.: PCT/IB2021/056621
§ 371 (c)(1),
(2) Date: Jan. 19, 2023

(87) PCT Pub. No.: WO2022/023892
PCT Pub. Date: Feb. 3, 2022

(65) Prior Publication Data
US 2023/0353069 A1    Nov. 2, 2023

(30) Foreign Application Priority Data
Jul. 27, 2020    (IT) .......................... 102020000018097

(51) Int. Cl.
*H02N 3/00*    (2006.01)

(52) U.S. Cl.
CPC .................................... *H02N 3/00* (2013.01)

(58) Field of Classification Search
CPC ................................... H02N 3/00; H02N 1/04
See application file for complete search history.

(56) References Cited

FOREIGN PATENT DOCUMENTS

WO    2020095222 A1    5/2020

OTHER PUBLICATIONS

International Search Report for International Patent Application No. PCT/IB2021/056621, mailed Oct. 11, 2021.
(Continued)

*Primary Examiner* — Mohamad A Musleh
(74) *Attorney, Agent, or Firm* — Armstrong Teasdale LLP

(57) ABSTRACT

A device for converting thermal energy into electrical energy has a first and second layer of thermally conductive material, and an intermediate layer of polymer material arranged between the first and second layers and having a thermal conductivity lower than the first and the second layers. A plurality of channels in which a colloidal suspension of active particles is contained is arranged inside the intermediate layer, the colloidal suspension being capable of flowing along each of the channels as a result of a temperature gradient applied between the first and second layers. Pick-up elements arranged along the channels are configured to extract electrostatic force or electromotive force induced as a response to a flow of the colloidal fluid as a result of at least one among a pyroelectric effect, a triboelectric effect, and thermomagnetic advection. Each channel forms a closed loop and has an outgoing branch and a return branch.

9 Claims, 3 Drawing Sheets

(56) References Cited

OTHER PUBLICATIONS

Garofalo Erik et al., Triboelectric Characterization of Colloidal TiO2 for Energy Harvesting Applications, Nanomaterials, Jun. 17, 2020, p. 1181, vol. 10, No. 6, MDPI, Basel, CH.

DEVICE FOR CONVERTING THERMAL ENERGY INTO ELECTRICAL ENERGY

CROSS-REFERENCE TO RELATED APPLICATIONS

This application is a National Stage Application of International Patent Application No. PCT/IB2021/056621, having an International Filing Date of Jul. 22, 2021, claiming priority to Italian Patent Application No. 102020000018097, having a filing date of Jul. 27, 2020, each of which is hereby incorporated by reference in its entirety.

FIELD OF THE INVENTION

The present invention relates to systems for converting thermal energy into electrical energy, in particular in order to recover energy from low-temperature waste heat.

BACKGROUND OF THE INVENTION

Energy consumption, environmental impact and sustainability have become keywords for the research community and represent key directives for the industrial production of the future. The transformation of energy, at every level of human society, is faced with the non-uniform efficiency of the tools being used, resulting in a distributed production of waste heat of 1200 TWh/year worldwide. The energy targeted by WHP (waste heat to power) technologies is typically low-level below 250° C. Given the thermodynamic Carnot cycle, the maximum theoretical conversion efficiency is below 3.28% for a temperature gradient of 10° C. For example, this means that, for a temperature gradient of 10° C. over 100 thermal W, it is possible to recover 3 electric W. The production of waste heat concerns industrial processes such as metal melting furnaces, furnaces for glass, cement synthesis, oil refineries, etc. Alternatively, it may concern the automotive industry, with waste heat temperatures in the range between 80 and 90° C. In a further application, the high reference temperature is that of the human body, while the low reference temperature is that of the external environment, with a dynamic range of ΔT that also depends on the instantaneous level of insulation, relative humidity and wind speed.

Depending on the type of application, there are preferred ways of recovering energy which depend on the space available at the installation site, heat transfer and conversion efficiency. In the industrial sector, the most applied technology is based on thermodynamic cycles: Brayton, Stirling and Kalina cycles have historically been the first to be implemented and are commonly used today in commercial plants. However, the organic Rankine cycle (ORC) has turned out to be the most promising field of research as a result of the availability and simplicity of the components and for the low corrosion, flammability and toxicity of the working fluid. This technology relies on a traditional electric turbine system which operates by evaporating an organic fluid that has a low boiling temperature. Its compactness and ease of installation have also allowed ORCs to be introduced into the automotive sector, where the restrictions on volume and weight are very important.

In the automotive field, an ORC turbine may be coupled to thermoelectric devices, thereby increasing the overall efficiency. The latter are based on the Seebeck effect, where a temperature gradient applied to the device allows a charge shift. The materials used to recover energy from low-temperature waste heat are typically bismuth telluride ($Bi_2Te_3$, n-type) or antimony telluride ($Sb_2Te_3$, p-type). These materials are applied over large surfaces to achieve the greatest possible heat transfer. Similar devices are also implemented in wearable applications where the available surface is not as wide so as to be comfortable for the user. It is noted that the main disadvantage of these apparatuses lies in their nature, i.e. in the fact that they are solid state and are therefore less adaptable, flexible and resilient than liquid devices.

One completely different approach relies on magnetic machines, in particular thermomagnetic systems. This type of device is based on the heat-induced effects on the magnetic properties of the ferromagnetic materials. For example, some thermomagnetic generators utilize the magnetic phase transition of ferromagnetic materials. This magnetic transition occurs as a result of a temperature transition above the Curie point, a specific temperature value at which ferromagnetic materials lose their magnetization. Rapid changes in the state of magnetization may therefore be used to convert thermal energy into electricity.

WO 2020/095222 A1 discloses a solution within the field of so-called magneto-thermo hydrodynamic systems. This system is designed to convert thermal energy into kinetic energy (flow of the carrier liquid) by utilizing thermomagnetic advection, a particular motion of the fluid allowed by the thermal gradient and by a parallel static magnetic field. The magnetic fluid, which is a colloid based on a liquid solvent and a dispersion of magnetite nanoparticles, referred to as a ferrofluid, is contained in a toroidal reservoir. Specific coils wound on the reservoir are used to extract electromotive force by means of induction (Faraday-Neumann-Lenz law). This system has proved to produce a small amount of energy with a correspondingly small thermal gradient (10 μW/K).

SUMMARY OF THE INVENTION

One object of the present invention is to provide a liquid-state solution for recovering energy from low-temperature waste heat that achieves relatively high efficiency as compared to known solutions.

A further object of the invention is to provide a liquid-state solution for recovering energy from low-temperature waste heat that achieves relatively high scalability by comparison with known systems.

In view of this object, the invention relates to a device for converting thermal energy into electrical energy, comprising a first and a second layer of thermally conductive material, an intermediate layer of polymer material which is arranged between the first and the second layer and has a thermal conductivity lower than the first and the second layer, wherein a plurality of channels in which a colloidal suspension of active particles is contained is arranged inside the intermediate layer, said colloidal suspension being capable of flowing along each of said channels as a result of a temperature gradient applied between the first and the second layer, and a plurality of pick-up elements arranged along said channels and configured to extract electrostatic force or electromotive force induced as a response to a flow of the colloidal suspension as a result of at least one among a pyroelectric effect, triboelectric effect and thermomagnetic advection, wherein each of said channels forms a closed loop and comprises an outgoing branch and a return branch extending in an asymmetrical helix, each of said outward branch and return branch comprising a plurality of turns, each of which has diametrically opposed portions adjacent to the first layer and to the second layer, respectively.

In the device according to the invention, the use of inorganic nanoparticles in a solvent that has electrically insulating properties makes it possible for the device to have high stability. Moreover, the asymmetrical helical shape of the channels allows the fluid to follow a preferred direction, thereby allowing greater utilization of the buoyancy and gravitational forces.

The proposed device is capable of recovering energy from extremely small temperature gradients, for example of 1° C., and is scalable without significant changes up to ΔT of 200° C.

With an appropriate choice of materials, it is also possible to directly collect energy from ΔT of 500° C. and above. By utilizing the pyroelectric effect, the device is also particularly efficient in the case of discontinuous gradients, where other devices fail to provide an output. The device is also simple and economic, and the materials used may be green and have a low toxicity (iron oxide, barium titanate, titanium oxide, water/ethanol may be toxic in the event of acute exposure, but when dispersed in a liquid carrier the risks of ingestion/inhalation are less significant).

By implementing kinetic conversion by means of thermomagnetic advection and implementing multiple physical effects to extract energy, it is possible to bring the device closer to the ideal efficiency of the Carnot cycle.

BRIEF DESCRIPTION OF THE DRAWINGS

Further features and advantages of the device according to the invention will be presented in the following detailed description which refers to the accompanying drawings, provided merely by way of non-limiting example, in which.

DETAILED DESCRIPTION

Figure 1:
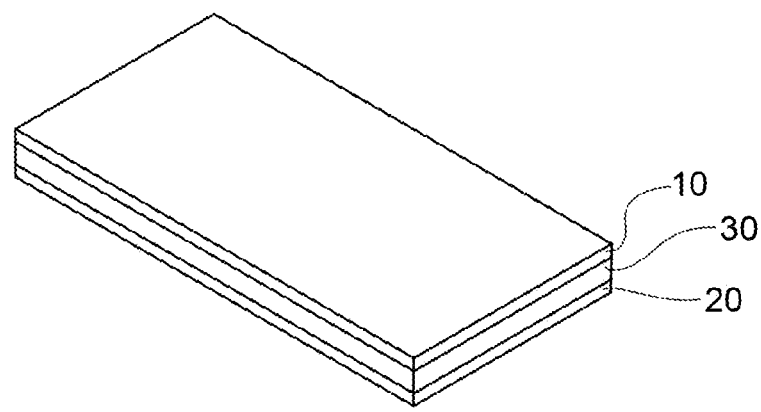
FIG. 1 is a perspective view of a first embodiment of a device according to the invention.
Figure 2:
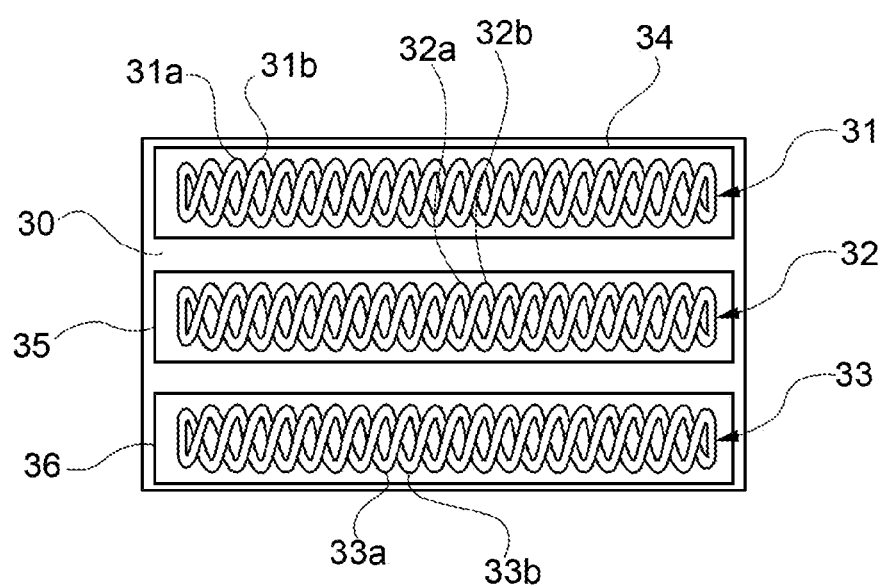
FIGS. 2 and 3 are, respectively, a plan view and a perspective view of the intermediate layer of the device in FIG. 1.
Figure 3:
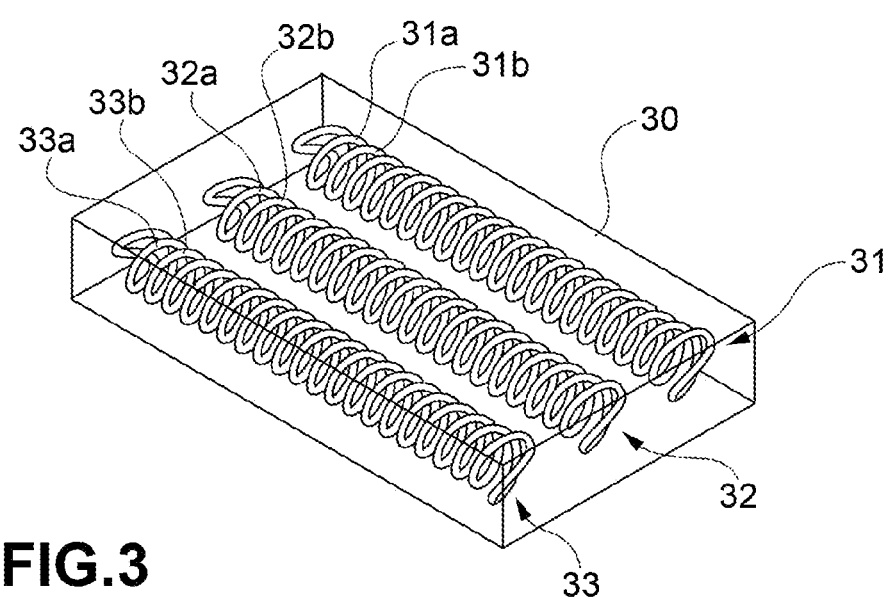

With reference to FIGS. 1 to 3, a device for converting thermal energy into electrical energy is shown, the device comprising a first and a second layer of thermally conductive material, indicated by 10 and 20 respectively, and an intermediate layer 30 of polymer material which is arranged between the first and the second layer 10, 20 and has a thermal conductivity lower than the first and the second layer.

The first layer 10 may be made of metal material or ceramic material which has a high thermal conductivity, for example aluminum, copper or PERLUCOR®. The polymer material of the intermediate layer 30 is preferably a material that has a very low thermal conductivity, for example polytetrafluoroethylene (PTFE). The second layer 20 may be made of metal material which has a high thermal conductivity, for example aluminum or copper.

A plurality of helical channels 31, 32, 33 is arranged inside the intermediate layer 30, in which channels a colloidal suspension of active particles is contained. This colloidal suspension is capable of flowing along each of the channels 31, 32, 33 as a result of a temperature gradient applied between the first and the second layer 10, 20.

In the illustrated example, the intermediate layer 30 comprises three adjacent volumes 34, 35, 36 which are physically separate, identified in FIG. 2 by three respective rectangular areas. In the following, these regions are referred to as the triboelectric region, pyroelectric region and thermomagnetic advection region, respectively. A different nanofluid flows through the relevant helical channel 31-33 in each region 34-36. The helical channels 31-33 may be formed as hollows in the polymer material of the intermediate layer 30 (for example, as ducts formed in the PTFE of the intermediate layer 30), or may be formed as tubes of polymer material embedded into the polymer material of the intermediate layer 30 (for example tubes made of PTFE-FEP, PVDF or PVC).

Figure 6:
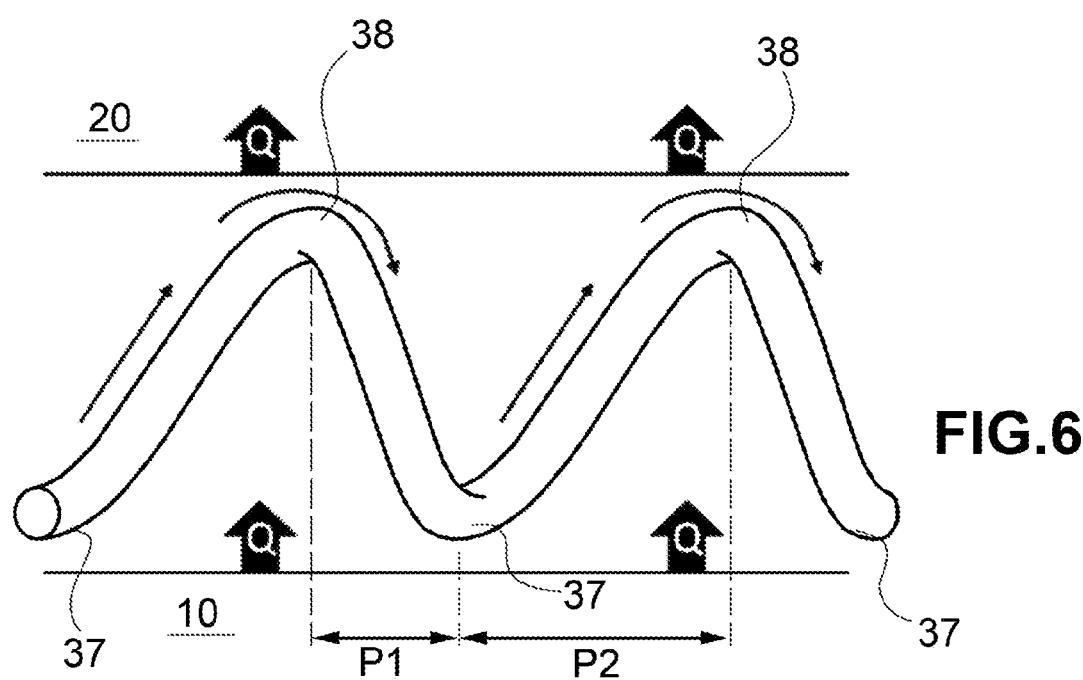
FIG. 6 is a perspective view of a portion of a helical channel of the device in FIG. 1, in which view the operating principle of the invention is shown.

Each of the channels 31-33 forms a closed loop and comprises an outgoing branch 31a, 32a, 32a and a return branch 31b, 32b, 33b extending in an asymmetric helix. Each of the outgoing branches 31a-33a and return branches 31b-33b comprises a plurality of turns, each of which has diametrically opposed portions 37, 38 adjacent to the first layer 10 and to the second layer 20, respectively. As may be seen in FIG. 6, "in an asymmetric helix" is understood to mean that the pitch of the helix comprises a first section (which extends from a portion 38 adjacent to the second layer 20 to the subsequent portion 37 adjacent to the first layer 10) and a second section (which extends from the portion 37 adjacent to the first layer 10 to the subsequent portion 38 adjacent to the second layer 20) which have different axial extensions P1 and P2. In particular, the second section may be longer than the first section and have an axial extension P2 which is from 1.01 to 2 times the axial extension P1 of the first section; in other words, $1.01*P1 \leq P2 \leq 2*P1$.

Each region 34-36 contains, respectively:
1. a suspension of active nanoparticles having a triboelectric effect (for example: $TiO_2$, titanium dioxide, in an anatase phase) dispersed in a solvent (water or oil-based solvent), flowing through the channel 31 formed in the triboelectric region 34;
2. a colloidal suspension of active nanoparticles that have a pyroelectric effect (for example: $BaTiO_3$, barium titanate) dispersed in a solvent (water or oil-based solvent), flowing through the channel 32 formed in the pyroelectric region 35;
3. a ferrofluid subjected to thermomagnetic advection (for example based on $Fe_3O_4$, magnetite) dispersed in a solvent (water or oil-based solvent), flowing through the channel 33 formed in the thermomagnetic advection region 36.

Each channel 31-33 has an inlet (not shown) for injecting the functional colloid and an outlet (not shown) for discharging air during the filling operations. Therefore, manufacturing the device according to the invention also has to comprise the operation of filling the channels 31-33 with colloids, in addition to manufacturing the structural part. The inlet and outlet are sealable, for example by means of a press-on cap which is removed in order to inject the colloid and allow air to escape and replaced before the device is put into operation.

Figure 4:
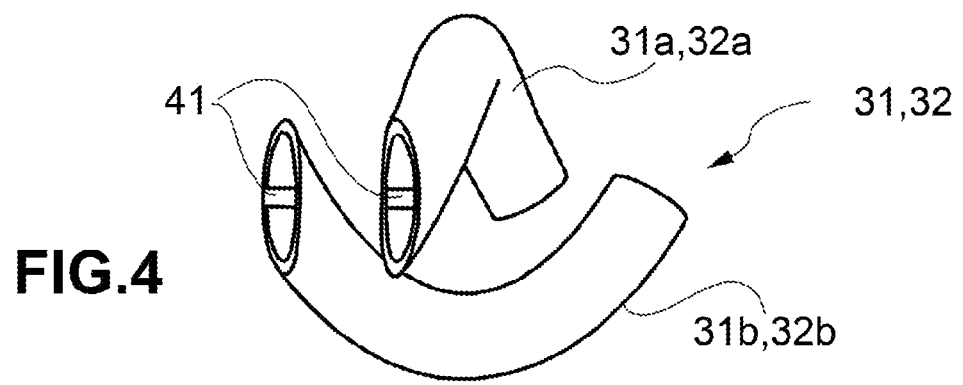
FIG. 4 is a perspective view of a portion of a helical channel of the device in FIG. 1, on which portion electrodes are arranged.

As shown in FIG. 4, metal electrodes 41 are arranged along the channels 31 and 32 in the triboelectric and pyroelectric regions 34 and 35, which electrodes are arranged in an intermediate position between the diametrically opposed portions 37 and 38 of the turns that are in thermal contact with the first layer 10 and the second layer 20, respectively. These electrodes 41 are used as pick-up elements to extract electrostatic force as a response to a flow of the colloidal fluid by means of a pyroelectric effect in the channel 31 and by means of a triboelectric effect in the channel 32, respectively.

Figure 5:
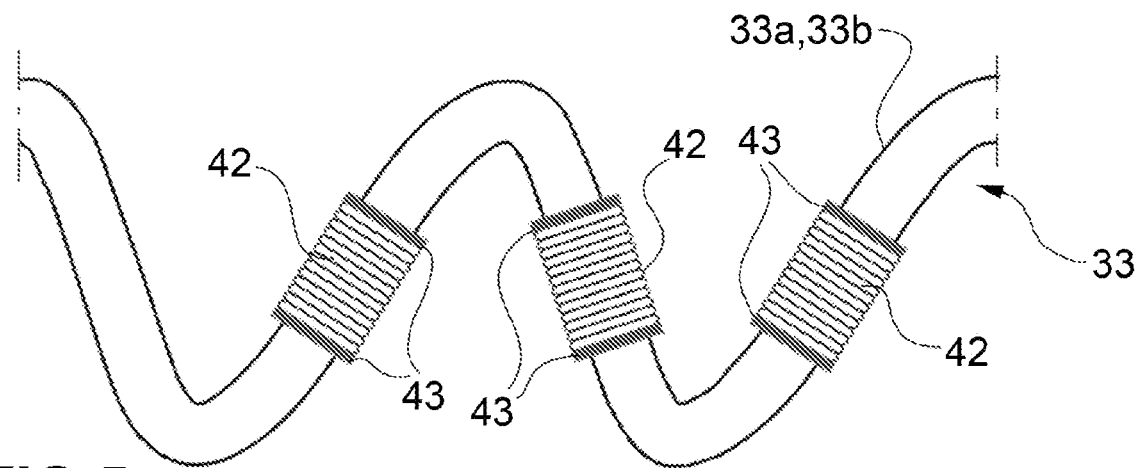
FIG. 5 is a perspective view of a portion of a helical channel of the device in FIG. 1, on which portion coils and permanent magnets are arranged.

As shown in FIG. 5, coils 42 (wound around the channel 33) are arranged along the channel 33 in the thermomagnetic advection region 36, which coils are arranged in an intermediate position between the diametrically opposed portions 37 and 38 of the turns that are in thermal contact with the first layer 10 and the second layer 20, respectively. These coils 42 are used as pick-up elements to extract electromotive force induced as a response to a flow of the colloidal fluid as a result of magnetic advection in the channel 33. Annular magnets 43 are also arranged along the channel 33, which magnets are provided to magnetize the nanoparticles dispersed in the solvent and increase the extraction efficiency.

The operation of the device is explained in the following:
1. The three channels 31-33 are filled with the respective fluids;
2. At the same time, the air is removed from the channels 31-33 through the respective discharge outlets;
3. The first layer 10 is mounted on a "hot" surface or environment, while the second layer 20 is placed in contact with a "cold" surface or environment (thus establishing a temperature gradient between the first layer 10 and the second layer 20). The hot surface may be an illuminated plane to which solar radiation transfers energy, or a portion to which waste heat is conveyed (for example: the heat sink of an engine or household appliance, or the roof or window/wall of a greenhouse). The cold surface may be a shaded area, or a radiator in thermal contact with the surroundings, or a radiator in thermal contact with a cooling circuit;
4. As a result of Rayleigh-Benard natural convention (in the channels 31, 32 and 33) and as a result of thermomagnetic advection (in the channel 33), the three nanofluids begin to flow in the respective channels. The device operates by cooling the hot surface and generating electricity by means of the capacitive electrodes 41 (channels 31 and 32) and inductive electrodes (channel 33). This electricity is made available for external loads. The device is capable of generating from about a minimum of 10 µW/K for each of the three regions to about a maximum to 1 mW/K, depending on operating conditions.
5a. Operating principle of the triboelectric region 34:
   i. In the channel 31 (in which only the triboelectric-effect fluid flows), the triboelectric nanoparticles (for example of titanium dioxide) become electrically charged as a result of the friction which occurs with their movement in the channel 31 (manufactured for example in PTFE-FEP);
   ii. When the fluid reaches the first metal electrode 41 (made for example of titanium), the accumulated charges are transferred to the electrode;
   iii. This happens for each segment between two consecutive electrodes 41;
   iv. By connecting the electrodes 41 in series, it is possible to add up the different potentials shifted to each pair of electrodes. The potential that may be generated is approximately in the range of from 1 to 10 V.
5b. Operating principle of the pyroelectric region 35:
   i. In the channel 32 (in which only the pyroelectric-effect fluid flows), the pyroelectric nanoparticles (for example of barium titanate) are forced to flow cyclically between a hot region and a cold region, and each particle is therefore subjected to a temporal variation in temperature. As a result of the pyroelectric effect and, to a lesser extent, the triboelectrification, the fluid becomes electrically charged;
   ii. When the fluid reaches the first metal electrode 41 (made for example of titanium), the accumulated charges are transferred to the electrode;
   iii. This happens for each segment between two consecutive electrodes;
   iv. By connecting the electrodes 41 in series, it is possible to add up the different potentials shifted to each pair of electrodes. The potential that may be generated is approximately in the range of from 10 to 100 V.
5c. Operating principle of the thermomagnetic advection region 36:
   i. In the channel 33 (in which only the thermomagnetic advection fluid flows), a ferrofluid subjected to thermomagnetic advection (for example based on $Fe_3O_4$) flows through the channel 33 on which the coils 42 are wound;
   ii. When the fluid approaches the annular magnets, it becomes magnetized and, by passing through the coils 42, induces an electromotive force in the coils;
   iii. This happens for each segment between two consecutive annular magnets;
   4. By connecting the coils 42 in parallel, it is possible to add up the different currents extracted by each coil. The current that may be generated is approximately 10 µA.

In order to increase the efficiency of the converter, it is important that the triboelectric and pyroelectric regions are physically separate, as otherwise the electrical charges would be compensated between the two fluids (including, for example, $TiO_2$ and $BaTiO_3$ nanoparticles) which only exhibit the triboelectric effect and the pyroelectric effect, respectively. Another but no less important aspect that suggests the three channels should be kept separate is practical use. It is generally only possible to optimize the physical effects in order to increase efficiency, particularly in a single device which operates using a mixture of thermomagnetic advection, pyroelectric and triboelectric colloids, at the expense of reducing the dimensions of the boundary parameter space. If, by chance, the external operating conditions change in such a way that they fall outside this reduced parameter space, the efficiency may become marginally low. It is therefore preferable to separate the channels in order to adapt to a naturally dynamic reality, where the physical parameters may exceptionally explore a large space of configurations. Nevertheless, the invention is not limited to the configuration with separate channels, but also comprises a device in which the thermomagnetic advection particles are mixed with the pyroelectric particles, a device in which the thermomagnetic advection particles are mixed with the triboelectric particles, or a device in which the thermomagnetic advection particles are mixed with the triboelectric particles and with the pyroelectric particles.

As mentioned above with reference to FIG. 6, the helical channels 31-33 have an asymmetric profile so as to allow the fluid to follow a preferred direction. Consider an intermediate portion of the channel, remote from the first layer 10 and the second layer 20. Taking into account a cross section orthogonal to the interfaces with these layers, it may be noted that the angle between the straight portion of the channel and the portion 37 in contact with the first layer 10, said hot layer, is approximately 45°, for example, while the angle between the straight portion of the channel and the portion 38 in contact with the second layer 20, said cold layer, is approximately 60°, for example. When a particle of the fluid inside the channel comes close to the "cold side," it is forced to move toward the "hot side" (from left to right in FIG. 6) as a result of the geometry of the channel. The explanation for this lies in the improved utilization of buoyancy and gravitational forces: heating facilitates buoyancy, and cooling facilitates gravitational forces. The required asymmetry is as follows: preferably between 30° and 50° for the angle between the channel and the hot side, and between 60 and 80° for the angle between the cold side and the channel.

According to an alternative embodiment, the slab shown in FIGS. 1-3 may be produced so as to be flexible. In this regard, the first layer 10 may be made from an elastomer which has a high thermal conductivity, for example an elastomer manufactured with thermally conductive silicon, an elastomer comprising elongated inclusions of liquid metal, mixtures of PDMS and carbon nanotubes, mixtures of rubber and graphene, or Thubber™. The intermediate layer 30 may be made from the same materials described with reference to the preceding embodiment. The second layer 20 may be made from an elastomer which has a high thermal conductivity, for example an elastomer manufactured with thermally conductive silicon, an elastomer comprising elongated inclusions of liquid metal, mixtures of PDMS and carbon nanotubes, mixtures of rubber and graphene, or Thubber™.

Otherwise, this second embodiment is identical to the preceding embodiment with regard to structure and functionality, and therefore will not be described further.

Figure 7:
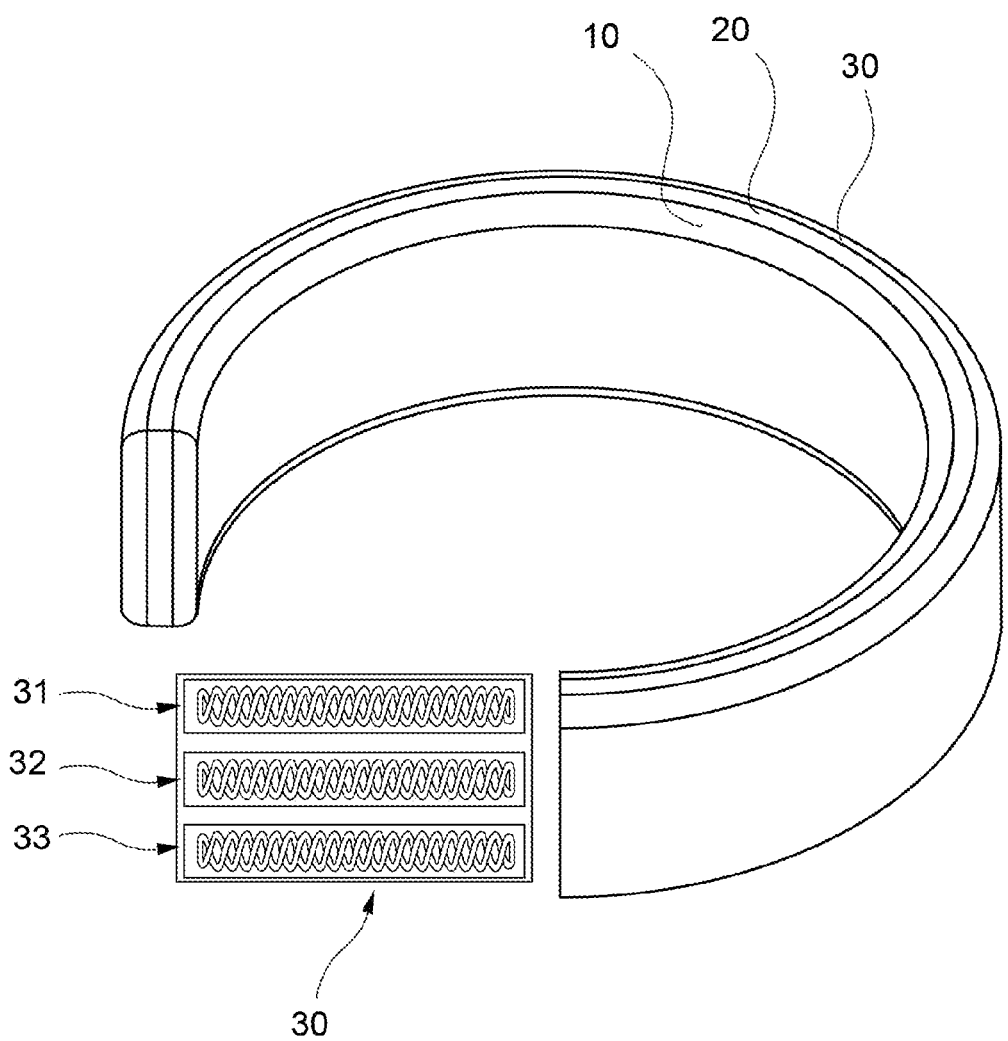
FIG. 7 is a perspective view of another embodiment of a device according to the invention.

With reference to FIG. 7, a third embodiment of the invention will now be described. This embodiment differs from the preceding embodiments in that two opposing ends of the slab are in fact joined so as to form a torus that has a rectangular cross section. Therefore, if the device is cut along the poloidal axis, the ring is composed of three different concentric layers, as shown in FIG. 7 (where the channels are linearized for clarity). These three layers may be made from the materials described for the first rigid embodiment or from the materials described for the second flexible embodiment.

The first layer or radially inner layer 10 may be arranged around a tube which conveys hot fluids (for example tubing for hot water for heating, tubing for flue gases or discharge tubing, or tubing for transporting oil).

Otherwise, this third embodiment is identical to the preceding embodiments with regard to structure and functionality, and therefore will not be described further.

What is claimed is:

1. A device for converting thermal energy into electrical energy, comprising a first layer and a second layer of thermally conductive material, an intermediate layer of polymer material arranged between the first and second layers and having a thermal conductivity lower than the first and second layers, wherein a plurality of channels in which a colloidal suspension of active particles is contained is arranged inside the intermediate layer, the colloidal suspension being capable of flowing along each channel of the plurality of channels as a result of a temperature gradient applied between the first layer and the second layer, and a plurality of pick-up elements arranged along said channels and configured to extract electrostatic force or electromotive force induced as a response to a flow of the colloidal suspension as a result of at least one among a pyroelectric effect, a triboelectric effect, and thermomagnetic advection, wherein each channel of the plurality of channels forms a closed loop and comprises an outgoing branch and a return branch extending as an asymmetrical helix, each of the outgoing and return branches comprising a plurality of turns, each of which has diametrically opposed portions adjacent to the first layer and to the second layer, respectively.

2. The device according to of claim 1, wherein the pick-up elements are positioned at at least some turns of the plurality of turns, in an intermediate position between the diametrically opposed portions.

3. The device according to of claim 1, wherein said channels are formed as hollows in the polymer material of the intermediate layer.

4. The device of claim 1, wherein said channels are formed as tubes embedded into the polymer material of the intermediate layer, said tubes being made of polymer material different from the polymer material of the intermediate layer.

5. The device of claim 1, wherein the plurality of pick-up elements comprises a plurality of electrodes.

6. The device of claim 1, wherein the plurality of pick-up elements comprises a plurality of coils and permanent magnets.

7. The device of claim 1, wherein the first and second layers and the intermediate layer are arranged to form a slab.

8. The device of claim 1, wherein the first and second layers and the intermediate layer are of flexible material.

9. The device of claim 1, wherein the first and second layers and the intermediate layer are arranged to form a torus.

* * * * *